UNITED STATES PATENT OFFICE.

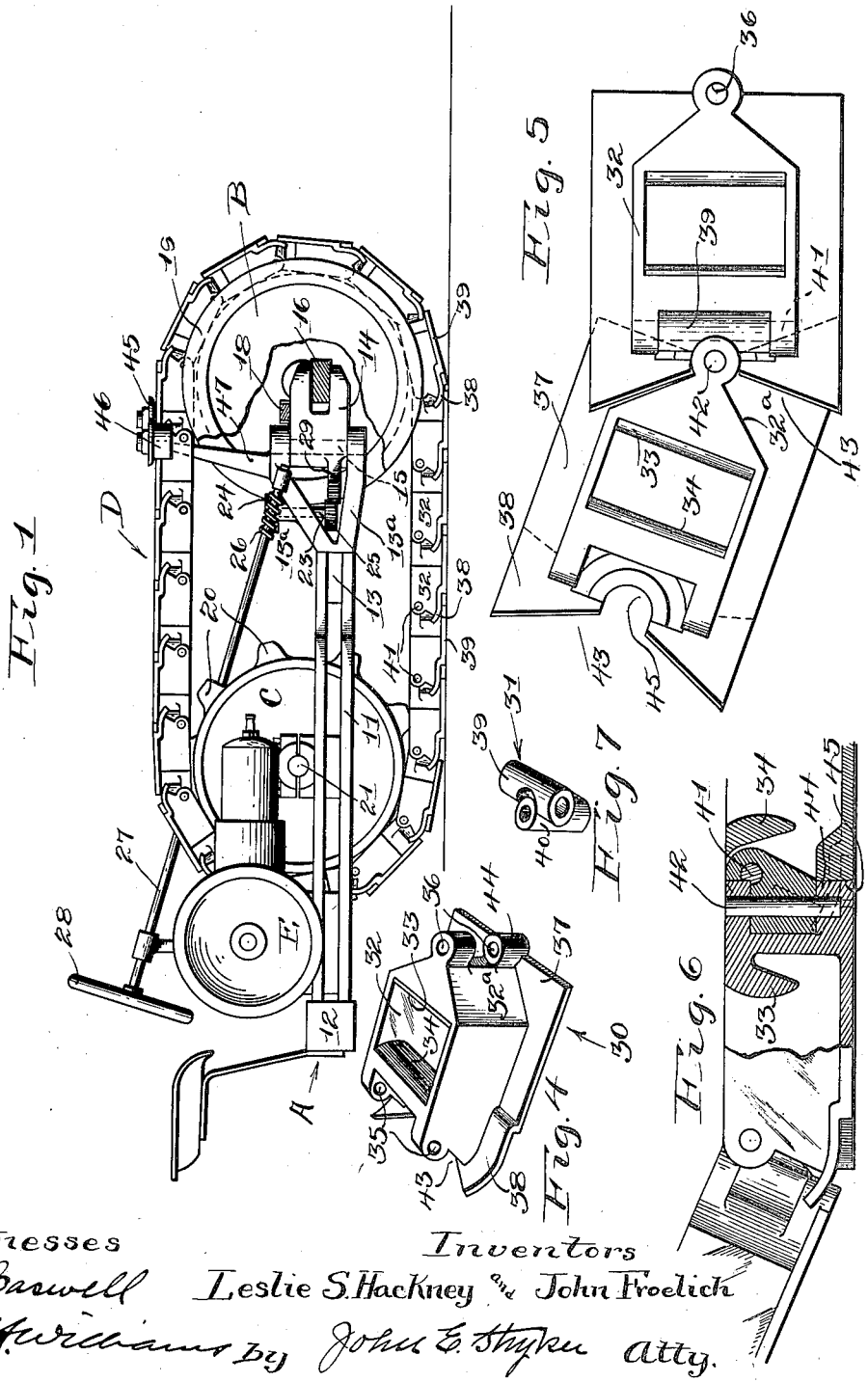

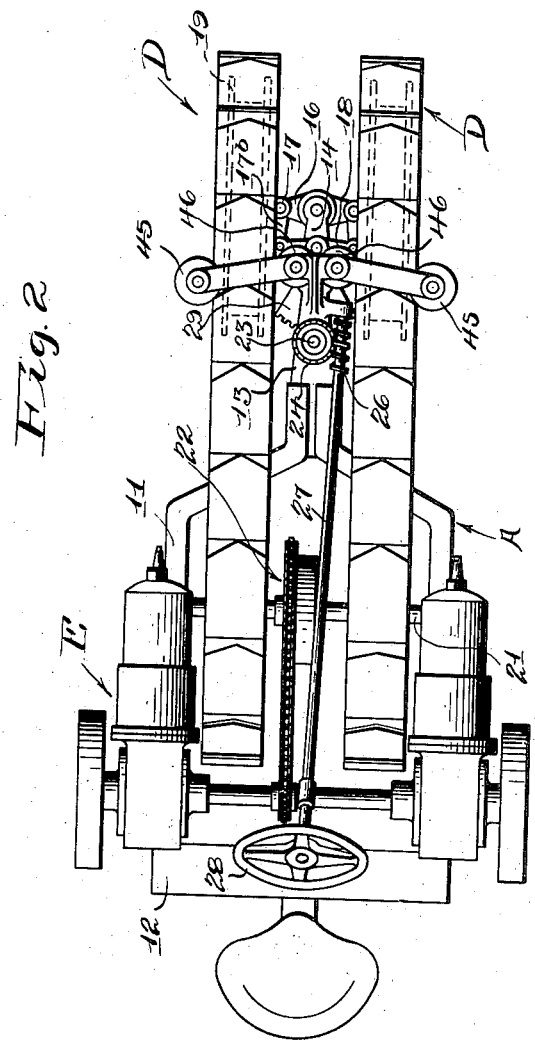

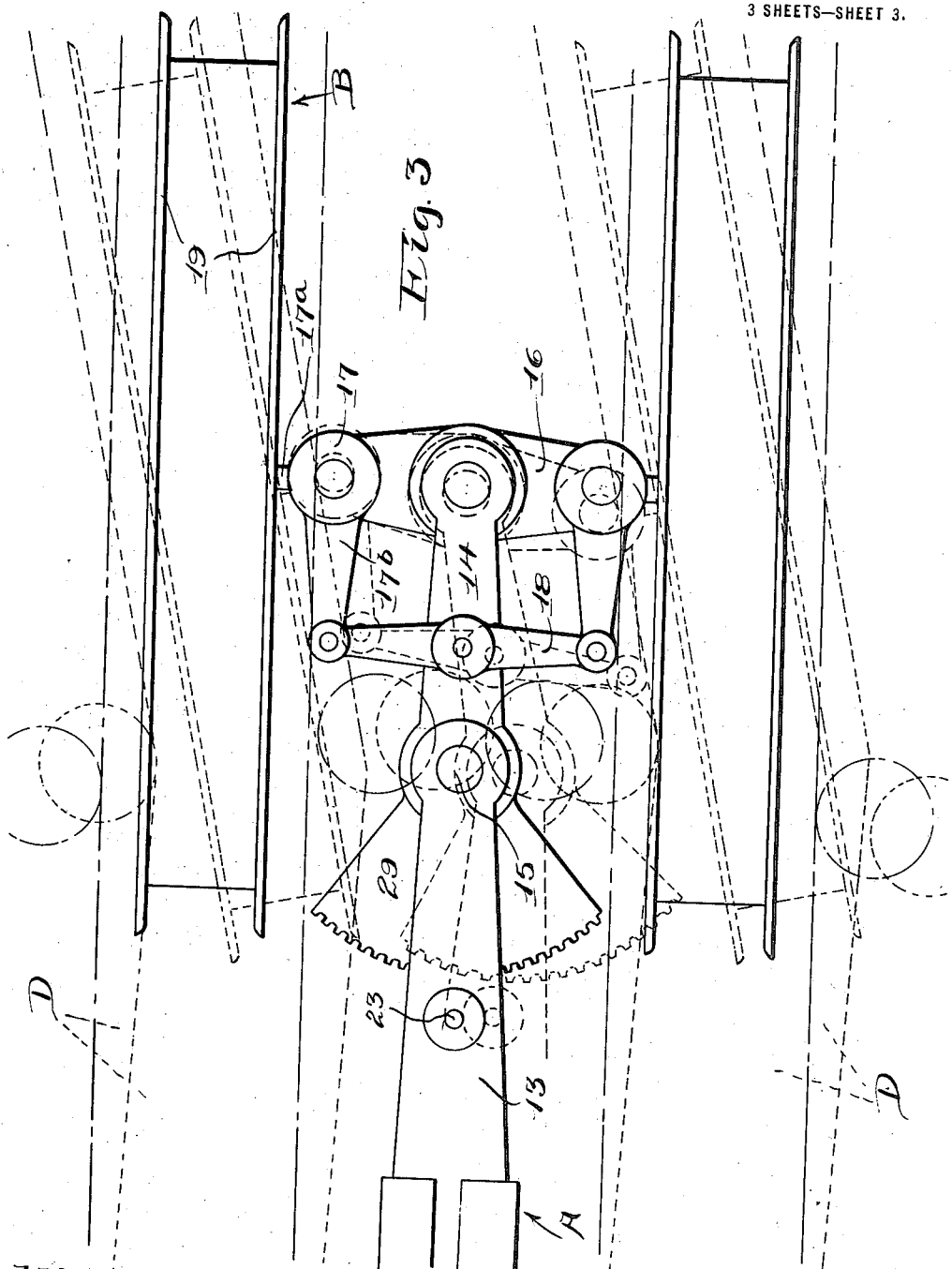

LESLIE S. HACKNEY AND JOHN FROELICH, OF ST. PAUL, MINNESOTA; SAID FROELICH ASSIGNOR TO SAID HACKNEY.

TRACTION-VEHICLE.

1,219,637. Specification of Letters Patent. Patented Mar. 20, 1917.

Application filed June 24, 1914. Serial No. 847,000.

*To all whom it may concern:*

Be it known that we, LESLIE S. HACKNEY and JOHN FROELICH, citizens of the United States, residing at St. Paul, in the county of Ramsey and State of Minnesota, have invented new and useful Improvements in Traction-Vehicles, of which the following is a specification.

Our invention relates to improvements in traction vehicles.

When traction vehicles are employed to supply motive power for cultivators and other earth-working implements, it is desirable to distribute the weight of the tractor over a considerable area to prevent the packing of the soil and it is also desirable to eliminate the rutting and gouging of the soil and damage to the crops occasioned by the use of the common forms of steering and supporting wheels employed in the ordinary forms of traction vehicles.

It is our object to furnish a tractor supported entirely by endless flexible treads having bearing surfaces of large area, said treads being flexible both laterally and longitudinally, and also to provide means for directing the path thereof whereby the machine may be guided by said treads.

A further object is to provide in a device of this kind a traction tread adapted to bridge the space between the supporting wheels.

In the drawings, Figure 1 is a side elevation of our improved traction vehicle partly broken away to show certain parts; Fig. 2 is a plan view thereof; Fig. 3 is a diagrammatic view showing the tread shifting mechanism in different positions; Fig. 4 is a perspective view in detail of one link of a tread; Figs. 5 and 6 are respectively plan and side views of connected links, the latter being broken away to illustrate various parts thereof and Fig. 7 is a perspective view in detail illustrating one of the hinges employed in connecting the links of the treads.

Referring to the accompanying drawings, we have used the reference letter A to indicate the frame, B and C the tread supporting wheels, D the flexible treads upon said wheels and E the engine for driving the wheels B.

The frame A is formed of parallel side beams 11 joined at the rear ends thereof by the beam 12. Said side beams converge at their forward ends and are joined by the bifurcated reach 13, which is secured thereto. The link 14 movable horizontally at one end upon the pivot 15, mounted between the arms 13ª of said reach 13, is bifurcated at its forward end to pivotally receive the front axle 16 of the tractor. Said axle 16 is provided with pivoted steering knuckles 17, each knuckle having a stub shaft 17ª and arm 17ᵇ thereon. The arms 17ᵇ are connected by the tie rod 18, which is pivotally secured at its center to the link 14.

A pair of idler wheels B, having flanges 19 upon their peripheries, are revolubly mounted upon the stub shafts 17ª and a pair of driving wheels C having sprocket teeth 20 thereon are fixed to the shaft 21. Said shaft is revolubly supported upon the side beams 11 of the frame A and is driven through suitable mechanism 22 by the engine E. Each of the flexible treads, more fully hereinafter described, passes over the driving wheel C and idler wheel B which support and drive the tread and the wheel B is swiveled to direct the path of the same.

We control the positions of the idler wheels B by the following mechanism: The vertical counter shaft 23 revoluble in the reach 13 is furnished at its upper end with a worm gear 24 and at its lower end with the spur gear 25. The worm gear 24 meshes with the worm 26 upon the steering shaft 27, which is revoluble upon the frame A and supplied with a hand wheel 28 for turning the same. The spur gear 25 meshes with the rack quadrant 29 formed upon the link 14 and when said hand wheel is turned swings said link and deflects the frame toward one side or the other at the pivot 15. As a result of this movement of said link the wheels B are turned to change the path of travel; the front axle 16 is tilted to prevent the tightening of one tread and the loosening of the other and the front and rear axles are drawn closer together to permit the treads to bend out of a direct line between their respective supporting wheels B and C. The turning of the wheels is caused by the movement of the tie rod 18 which is secured to the link 14 and steering knuckles 17 to shift the latter. The turning of one wheel, which tends to loosen the tread thereon, operates through the adjacent steering knuckle to throw forward the end of the front axle next to said knuckle and the corresponding movement of the other wheel, tending to tighten the opposite tread, acts through its steering knuckle to shift the adjacent end of said axle rearwardly.

The treads consist of a plurality of similar links 30 joined together in series by means of hinges 31. Each link comprises a hollow tooth receiving body 32 having tooth engaging surfaces 33 and 34 thereon, horizontal apertures 35 at one end thereof and vertical apertures 36 at the other end together with a tread plate 37 and a curved shield 38 at the base of said body portion. The hinge 31 consisting of two bearings 39 and 40 integral with and at right angles to each other is employed to flexibly connect said links. The bearing 39 of the hinge is pivoted upon the pintle 41 mounted in the horizontal apertures 35 of one link and the bearing 40 is pivoted upon the pintle 42 mounted in the vertical apertures 36 of the adjacent link. Said links are free to swing laterally in either direction, the beveled forward end 32$^a$ of one link being adapted to play in the V shaped opening 43 at the end of the shield 38 of the adjacent link. The links pivot vertically upon the horizontal pintles 41 to permit the treads to pass around the wheels B and C, but such pivotal movement in the opposite direction is prevented by the bearing 44 of each link which seats in a companion socket 45 of the adjacent link, whereby a rigid supporting bridge or track is formed between the wheels B and C.

Guide rollers 45 and 46 for each tread are carried by a support 47 upon the reach 13 and said rollers engage opposite sides of their respective treads to direct the same between the flanges 19 of the idler wheel B upon which the tread travels.

In operation, the treads pass around the peripheries of the wheels B and C. The body portions 32 of the links 30 receive the teeth 20 of the wheels C and pass between the flanges 19 of the wheels B. Manipulation of the hand wheel 28 turns the wheels B and directs the course of the treads from a straight line to a curve or vice versa, thus changing the path of the machine.

While we have illustrated and described the preferred structure embodying our invention, we do not thereby limit ourselves to the particular form shown, as it is obvious that one tread may be employed in lieu of two treads and that other parts may be omitted from the device shown or additions made thereto without departing from the spirit of our invention.

Having described our invention, what we claim as new and desire to protect by Letters Patent, is:

1. In a traction vehicle, a frame, a pair of supporting wheels on said frame, a tread mounted on said wheels comprising a series of links having double pivotal connections allowing said tread to bend over the wheels and also to bend laterally between said wheels, said links being designed to coact with each other so that the upper run of the tread is self-supporting against sagging movements and the lower run thereof inflexible against upwardly directed forces, and means for bending said tread laterally to guide the vehicle.

2. In a traction vehicle, a frame, a pair of endless treads, revoluble supporting wheels for each tread, one of said wheels being toothed and rotated by power and the other wheel being swiveled and free to turn upon said frame, each tread consisting of a series of flexibly connected links adapted to mesh with a toothed wheel, said treads being designed to bend laterally in either direction to change the path of the vehicle and bend longitudinally in one direction only, whereby the links are permitted to turn about the wheels, but are rigidly held with respect to each other between said wheels to form a bridge between them, whereby the upper run of said tread will be self-supporting against sagging movement and the lower run adapted to resist forces tending to bend it upward and means for pivoting the swiveled wheels to bend the treads laterally and guide the vehicle.

3. In a traction vehicle, a frame, a pair of supporting wheels on said frame, a flexible tread movably mounted on said wheels, means for bending said tread laterally to change the path of the vehicle, said tread being also adapted to bridge the space between the wheels, the upper run of the tread being self-supporting against sagging movement and the lower run adapted to resist forces tending to bend it upward, and means for regulating the distance between said wheels to maintain uniform tension of the treads.

4. In a traction vehicle, a frame consisting of horizontally pivoted members, driving wheels revoluble on one frame member, revoluble idler wheels swiveled on the other member, a pair of flexible treads, each tread being movably mounted at one end on a driving wheel and at the other end on an idler wheel, connecting links between said swiveled wheels and the frame member upon which said wheels are mounted to correlate the movement of the wheels and frame member and means to swing one frame member with respect to the other, whereby the treads are bent to change the path of the vehicle and the relation of the wheels changed to maintain uniform tension of the treads.

5. In a traction vehicle, a frame, two driving wheels revolubly fixed upon the frame, a front axle pivoted horizontally upon said frame, idler wheels swiveled at opposite ends of said axle, a pair of flexible treads, each of said treads being adapted to pass over the peripheries of a drive wheel and an idler wheel at one side of the frame and means for pivoting the idler wheels to bend the treads laterally, said front axle being adapted to oscillate when the idler wheels are turned to retain the positions of said wheels with respect to the driving wheels and thereby prevent the tightening of one tread and the loosening of the other.

6. In a traction vehicle, a frame, supporting wheels on said frame, endless power driven treads movably mounted on said wheels, the upper runs of said treads being self-supporting against sagging movements and the lower runs inflexible against upwardly directed forces, means for bending the treads laterally and means for changing the relation of the wheels to maintain uniform tension in said treads.

7. In a traction vehicle, a frame, flexible traction treads therefor, driving wheels revolubly fixed upon the frame and idler wheels swiveled thereon, one of each of said wheels being employed to direct one of said treads in an endless path, means for pivoting the idler wheels to bend the treads, compensating means to prevent the tightening of one tread and the loosening of the other and means for positively changing the relation between said drive and idler wheels to maintain uniform tension of the treads.

8. In a traction vehicle, a frame having the front axle thereof pivoted horizontally upon a link, two driving wheels revolubly fixed upon the frame, idler wheels swiveled at opposite ends of said axle, a pair of flexible treads, each of said treads being adapted to pass over the peripheries of a drive wheel and an idler wheel at one side of the frame, a tie rod operatively connecting said idler wheels and pivotally attached to said link and means for swinging said link, whereby the idler wheels are turned to bend the treads and said wheels are moved toward and from the driving wheels.

9. In a traction vehicle, a frame, a drive wheel and a swiveled idler wheel thereon, a tread movable in an endless path around the peripheries of said wheels and means for bending the tread laterally to guide the vehicle, means for positively adjusting the relation between said wheels to maintain uniform tension in the tread, said tread comprising a series of flexibly connected links adapted to be engaged and be propelled by said driving wheel.

10. In a traction vehicle, a frame, a driving sprocket wheel and a swiveled idler wheel mounted on said frame, a tread movable upon the peripheries of said wheels and means for bending the tread laterally to guide the vehicle, said tread consisting of a series of flexibly connected links, each link comprising a tooth receiving portion adapted to receive the teeth of said sprocket wheel and a tread plate on the bottom of said tooth receiving portion.

11. In a traction vehicle, a frame, a driving sprocket wheel and a swiveled idler wheel mounted on said frame, a tread movable upon the peripheries of said wheels and means for bending the tread laterally to guide the vehicle, said tread consisting of a series of flexibly connected links, each link comprising a tooth receiving portion adapted to receive the teeth of said sprocket wheel, a tread plate on the bottom of said tooth receiving portion and a curved shield projecting from said plate.

12. In a traction vehicle, a frame, a driving sprocket wheel and a swiveled idler wheel mounted on said frame, the latter being formed with annular flanges on its periphery, a tread movable upon the peripheries of said wheels and means for bending the tread laterally to guide the vehicle, said tread consisting of a series of flexibly connected links, each link comprising a tooth receiving portion adapted to receive the teeth of said sprocket wheel and pass between the flanges of the idler wheel and a tread plate on the bottom of said tooth receiving portion.

In testimony whereof, we have signed our names to this specification in the presence of two subscribing witnesses.

LESLIE S. HACKNEY.
JOHN FROELICH.

Witnesses:
F. C. CASWELL,
LOUIS JOHNSON.